United States Patent [19]

Nagasaki

[11] Patent Number: 4,584,606
[45] Date of Patent: Apr. 22, 1986

[54] IMAGE PICKUP MEANS

[75] Inventor: Tatsuo Nagasaki, Musashino, Japan

[73] Assignee: Olympus Optical Co., Ltd., Japan

[21] Appl. No.: 646,283

[22] Filed: Aug. 31, 1984

[30] Foreign Application Priority Data

Sep. 1, 1983 [JP] Japan ................................ 58-160916
Sep. 1, 1983 [JP] Japan ................................ 58-160917

[51] Int. Cl.⁴ .............................................. H04N 5/30
[52] U.S. Cl. ................................. 358/209; 358/225
[58] Field of Search ............... 358/209, 211, 212, 213, 358/225; 250/578, 213 VT; 357/24 LR

[56] References Cited

U.S. PATENT DOCUMENTS 3,651,252  3/1972  Land et al. ......................... 250/578
3,934,153  1/1976  Lindley et al. ..................... 250/578
4,325,083  4/1982  Rouchon et al. ................... 358/228
4,366,377  12/1982  Notthoff et al. ................... 250/578
4,480,269  10/1984  Yoshida et al. .................... 358/213

Primary Examiner—Gene Z. Rubinson
Assistant Examiner—Stephen Brinich
Attorney, Agent, or Firm—Armstrong, Nikaio, Marmelstein & Kubovcik

[57] ABSTRACT

Image pickup means which incorporate means for logarithmically converting the incident light intensity, for controlling the light intensity issued with a plurality of varied intensities, and performing electrically the controlling of throttling of light intensity and dynamic range by receiving the light from the controlling means on pickup elements, adding the converted electrical signals, corresponding to the light intensity received on the pickup elements, through adder means to provide electrical signals having a magnified dynamic range and processing these electrical signals through subsequent circuits.

29 Claims, 22 Drawing Figures

IMAGE PICKUP MEANS

BACKGROUND OF THE INVENTION

The present invention related to image pickup means in television cameras, electronic cameras, etc. employing a charge-coupled device (referred to hereinafter as a CCD) and designed to extend the dynamic range by converting the input and output of the pickup elements to logarithmic values.

There have recently been developed means employing CCDs as pickup elements in television cameras, electronic cameras, etc.

As is well known, the CCD stores an electric charge in a potential well provided in a semiconductor and transfers the stored charge along the surface of the semiconductor by displacing sequentially the minimum position of potential by applying a transferring voltage from a external source. It has not only an image pickup region of a plurality of two-dimensionally arranged picture elements but also a charge accumulating region and horizontal and vertical scanning circuits and is driven by a driver circuit attached thereto. When the CCD is employed as an image pickup element, electric charge proportional to the light intensity incident to the receiver surface is stored in each potential well as image signals.

FIG. 1 illustrates the relation between the CCD output vs. the incident light intensity plotted on the logarithmic scale wherein the CCD output is increased linearly with the increased logarithmic light intensity to a constant saturated level. In FIG. 1, the range of CCD output from the noise level N to the saturated level S is termed the dynamic range of the CCD and abbreviated as D. The dynamic range amounts normally to about 30 dB.

On the other hand, pickup means require normally a dynamic range from 60 to 90 dB so that there arises a problem that the incident light intensity should be controlled by throttling the incident light intensity to the required intensity range for providing the dynamic range of 30 dB.

BRIEF SUMMARY OF THE INVENTION

It is a principal object of the present invention to provide image pickup means capable of extended dynamic range of light signals to be converted into electrical signals, by converting the input and output of the pickup means to logarithmic values, in view of the above disclosure.

It is another object of the present invention to provide image pickup means capable of easily electrically effecting the control of throttling and dynamic range in the trailing circuitry after the conversion of light signals to the electrical signals.

Other features and advantages of the present invention will be elucidated sufficiently by the following disclosure.

DETAILED DESCRIPTION OF THE EMBODIMENTS

Figure 1:
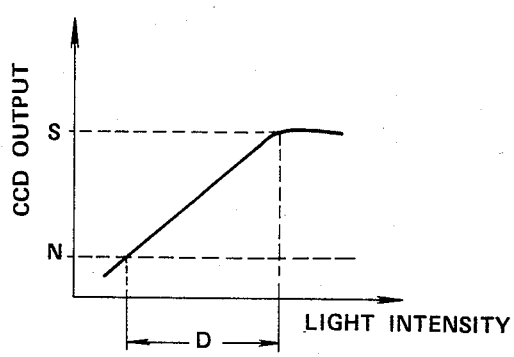
FIG. 1 illustrates a characteristic curve showing the relation between the light intensity input to the pickup means and the CCD output.
Figure 2:
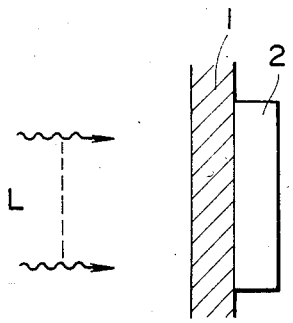
FIG. 2 is a schematic view showing the fundamental conception of the pickup means according to the present invention.

In FIG. 2, numeral 1 represents a non-linear filter having a light transmitting characteristic of converting an intensity x of incident light L to an intensity of log (x+1) of the transmitted light therethrough. By arranging filter 1 on the light receiving surface of CCD 2, it is possible to obtain electrical signals having a wider dynamic range than that of CCD 2.

Figure 3:
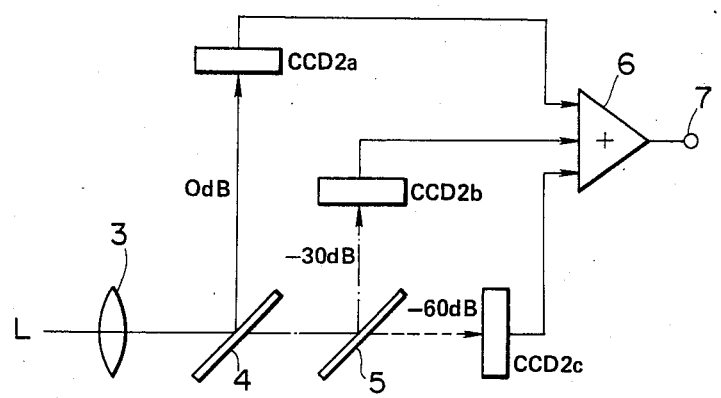
FIG. 3 is a block diagram of a first embodiment of the pickup means according to the present invention.

FIG. 3 relates to the first embodiment of the present invention and illustrates a block diagram employing three CCDs and two half-mirrors. Half-mirrors 4, 5 inclined at 45° to the direction of incident light L are arranged apart a predetermined distance to each other on the same straight line at the rear side of pickup lens 3 receiving incident light L. Half-mirrors 4, 5 have a characteristic that the difference in the intensities of light reflected thereby and light transmitted therethrough is about −30 dB. CCD 2a is arranged in correspondence with half-mirror 4 in the direction perpendicular to incident light L and CCD 2b is arranged in correspondence with half-mirror 5 in the direction perpendicular to incident light L and CCD 2c is arranged at the rear side of half-mirror 5 in the direction of incident light L. CCDs 2a, 2b, 2c each have a dynamic range of 30 dB. The outputs from CCDs 2a, 2b, 2c are applied to adder 6 to provide an added output at the output terminal 7. The added output is processed in a required manner and displayed on a display (not shown).

Figure 4:
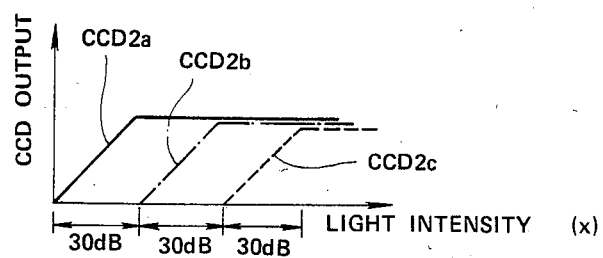
FIG. 4 illustrates characteristic curves showing the relation between the light intensity and CCD output for each CCD in the pickup means as shown in FIG. 3.
Figure 5:
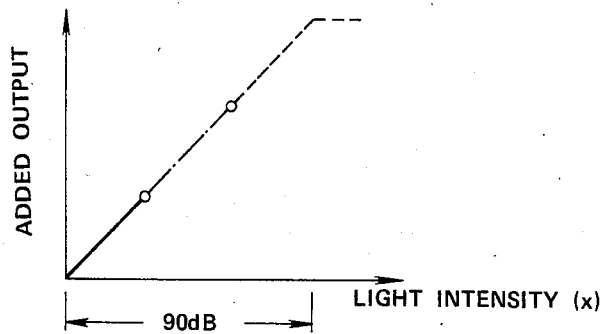
FIG. 5 is a characteristic curve showing the overall relation between the light intensity and CCD output in the pickup means as shown in FIG. 3.

Through such a structure, incident light L is passed through pickup lens 3 and partly reflected by half-mirror 4 and partly transmitted. The light reflected by half-mirror 4 is received by CCD 2a and the light transmitted through half-mirror 4 is incident to half-mirror 5. The light reflected by half-mirror 5 is received by CCD 2b and the light transmitted through half-mirror 5 is received by CCD 2c. If the light reflected by half-mirror 4 is 0 dB, then the transmitted light is damped to −30 dB. The light transmitted through half-mirror 5 is damped to −60 dB. Accordingly, the light intensities received by the three CCDs, 2a, 2b, 2c are 0 dB, −30 dB and −60 dB, respectively and the signals of 0 dB, −30 dB and −60 dB detected by each CCD, 2a, 2b, 2c are applied to adder 6 to be added. The characteristic curve showing the relation between the outputs from each CCD 2a, 2b, 2c and the incident light L intensity x is represented as shown in FIG. 4 wherein the incident intensity x on the abscissa is represented on the logarithmic scale and the solid line shows the relation for CCD 2a, the chain (solid line-one dot) line shows the relation for CCD 2b and the broken line shows the relation for CCD 2c. Accordingly, as shown in FIG. 5, the added output from the output terminal 7 has a logarithmic characteristic of log (x+1) with respect to the incident light intensity x depicted on the logarithmic scale, and has a dynamic range of 90 dB. In such manner, the dynamic range can be further extended by increasing the number of CCDs and the number of mirrors or by designing a structure for reducing the sensitivities of the CCDs to −30 dB and −60 dB to reduce the noise from the CCDs in lieu of using increased numbers of CCDs and half-mirrors.

Figure 6:
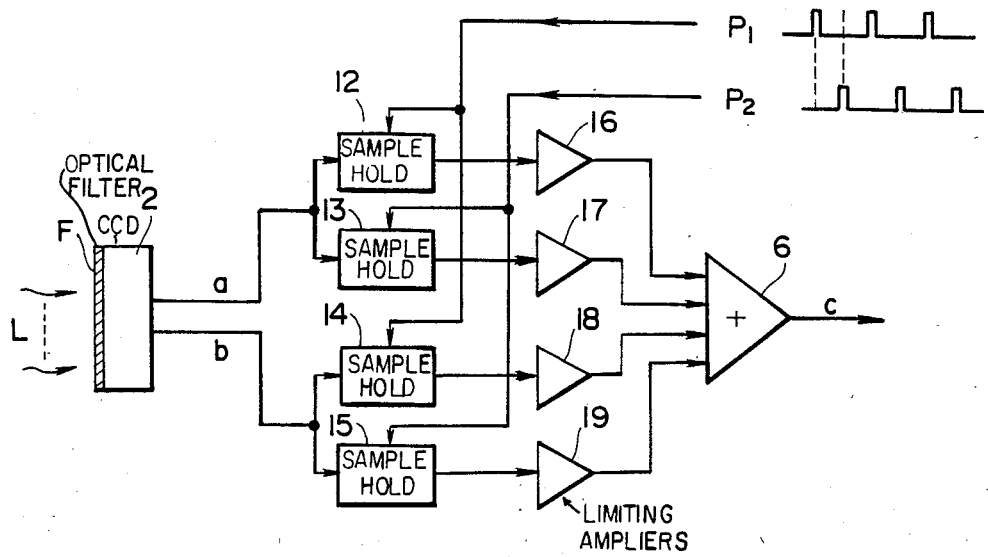
FIG. 6 is a block diagram of a second embodiment of the pickup means according to the present invention.
Figure 7:
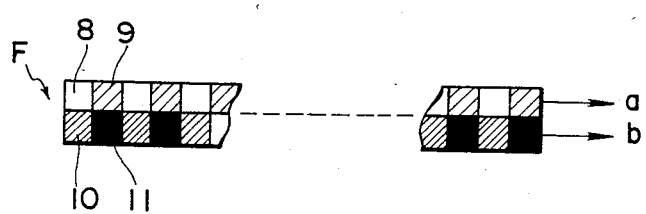
FIG. 7 is an enlarged front view of a portion of the optical filter as employed in the means of FIG. 6.

FIG. 6 relates to the second embodiment according to the present invention wherein one CCD and optical filter are employed. FIG. 7 illustrates the structure of such an optical filter F. FIG. 7 illustrates a portion comprising two horizontally arranged rows of four filter elements 9-11 each having a damping factor differeing by 30 dB. In the actual filter, such horizontally arranged rows are arranged vertically on a plane. Numeral 8 illustrates a filter element having a damping factor of 0 dB and numerals 9, 10, 11 designate filter elements having a respective damping factor of −30, −60 or −90 dB. Filter elements 8 and 9 are alternatively arranged on a straight line and filter elements 10 and 11 are alternatively arranged on a neighboring straight line along the straight line for the filter elements 8 and 9. In addition, as shown in FIG. 6, optical filter F having the arranged filter elements as mentioned above is bonded to the receiver surface of CCD 2. An output a is picked up from the positions of CCD 2 corresponding to the rows of elements 8, 9 and the output b is picked up from the positions of CCD 2 corresponding to the rows of elements 10, 11. CCD 2 has a dynamic range of 30 dB. Output a from CCD 2 is applied to the sample holding circuits 12, 13 and output b from CCD 2 is applied to sample holding circuits 14, 15. Sample holding circuits 12, 14 are supplied with sampling pulse $P_1$ and sample hold circuits 13, 15 are supplied with sampling pulse $P_2$. Sampling pulse $P_1$ is applied for sampling holding the CCD output corresponding to the light incident to filter elements 8, 10 and sampling pulse $P_2$ is a pulse having the same period as $P_1$ but a phase lag of one-half of the period of $P_1$. The outputs from sample hold circuits 12-15 are supplied respectively to limiting amplifiers 16-19 to be converted to a constant amplitude and applied to adder 6 to be added. The added output c is applied to video processor circuitry (not shown) to be processed as video signals and displayed on a displayer (not shown).

Figure 8:
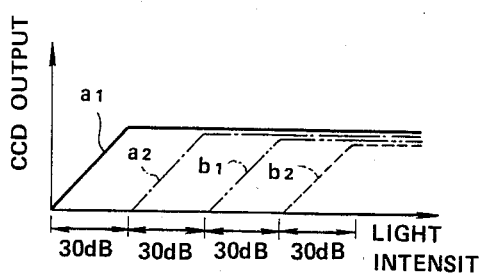
FIG. 8 is a characteristic curve showing the relation between the light intensity and CCD output corresponding to each filter element.
Figure 9:
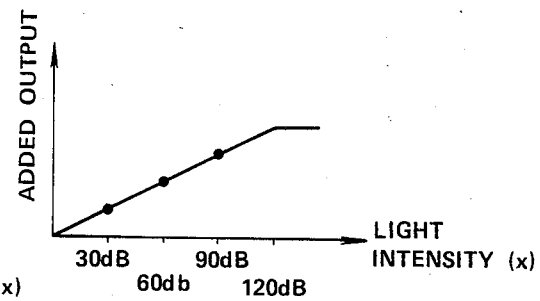
FIG. 9 is a characteristic curve showing the overall relation between the light intensity and CCD output in the means as shown in FIG. 6.

Through such a structure, the outputs corresponding to the light intensities are sampled held through sample hold circuits 12-15, wherein sample hold circuits 12-15 hold respectively outputs $a_1$, $a_2$, $b_1$ and $b_2$ corresponding respectively to the light intensities of 0, −30, −60 and −90 dB being transmitted respectively through filter elements 8-11. Hence the relation between outputs $a_1$, $a_2$, $b_1$, $b_2$ from CCD 2 and light of intensity x transmitted through optical filter F is represented as shown in FIG. 8, wherein incident light intensity x is plotted on the abscissa on a logarithmic scale and the solid line-one dot chain line, two dot chain line and broken line represent respectively the input/output characteristics corresponding respectively to filter elements 8, 9, 10 and 11. Hence, as shown in FIGS. 6 and 9, the added output c is provided with a logarithmic characteristic of log (x+1) with respect to the light intensity x and thus has dynamic range of 120 dB. By the way, the structure as shown in FIG. 7 may be modified by providing at least 4 filter elements having different damping factors, arranging alternately at least two rows each comprising at least two alternately arranged filter elements having damping factors close to each other and aligned on a straight line, and arranging at least two sample hold circuits as shown in FIG. 6 and applying at least two sampling pulses having different phases for adding the sample hold outputs.

Figure 10:
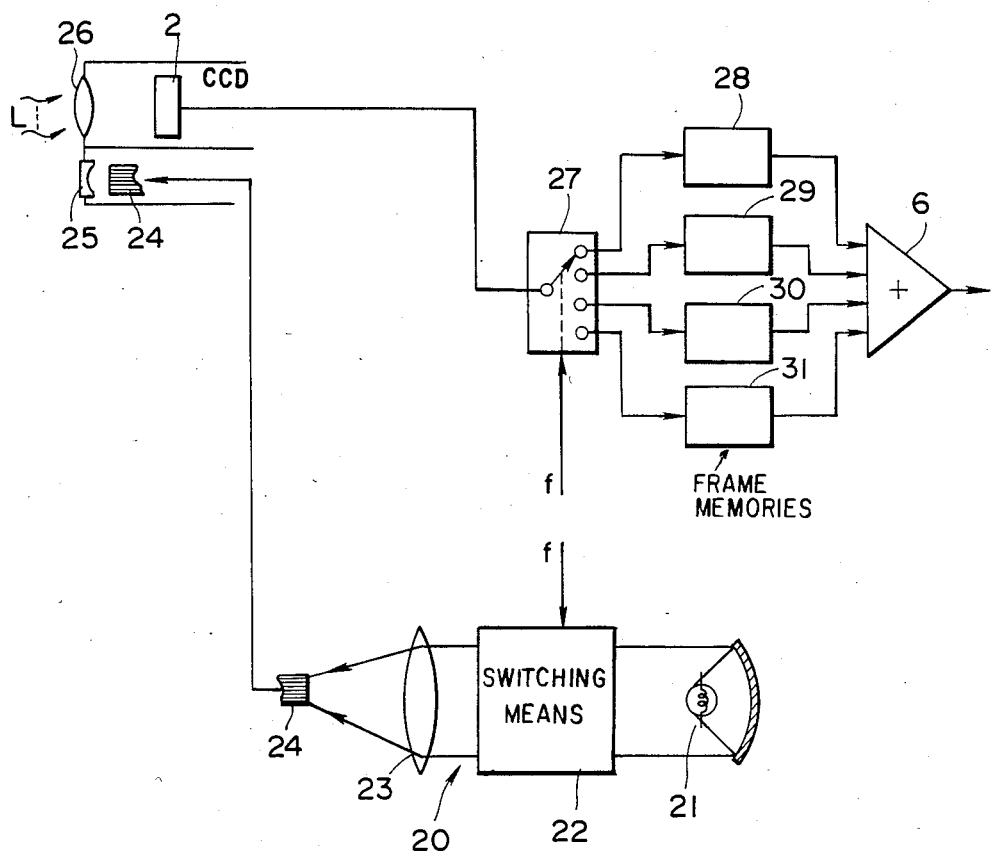
FIG. 10 is a block diagram of a third embodiment of the pickup means according to the present invention.

FIG. 10 relates to the third embodiment of the present invention constructed with one CCD and means for control of illuminating light intensity. In this embodiment, light source means 20 capable of switching the incident light intensity is provided as the controlling means. Light source means 20 are composed of light source 21 equipped with a reflector, switching means 22 for stepwise switching the light to a logarithmically varied light intensity, such as 4 steps of light intensities each damped by 30 dB to be transmitted, and an optical path 24 including a lens 23 for guiding the emitted light from said switching means 22 into a glass fibre bundle, etc. The light transmitted through optical path 24 is irradiated through pickup lens 25 on to an object to be imaged (not shown). The light reflected by the object is received by CCD 2 through pickup lens 26 to be converted to an electrical signal of a level corresponding to the light intensity of incident light L and applied to switching circuit 27. Switching circuit 27 has a number of output terminals equal to the number of switching steps of the light intensity in the switching means 22 in said light source means 20 and is designed to be switched at the frame period synchronized with switching means 22 using the same switching signal f. When the light intensity is switched in four steps, each output terminal from switching circuit 27 is connected respectively to each of frame memories 28-31, and each output from each memory is applied to adder 6 to be added. The added output is processed through a video signal processor circuit (not shown) as video signals and displayed on a display (not shown).

Figure 11:
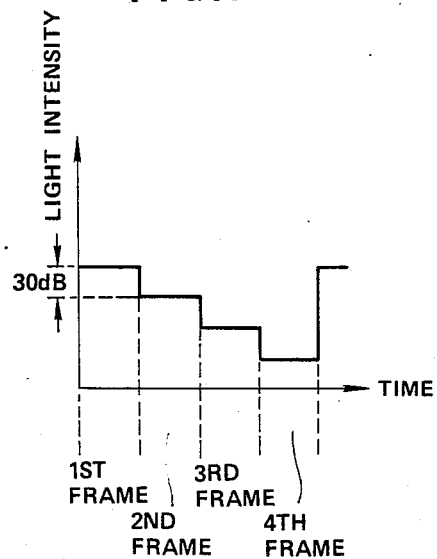
FIG. 11 is a characteristic curve of the light intensity controlled by the light source means as shown in FIG. 10.
Figure 12:
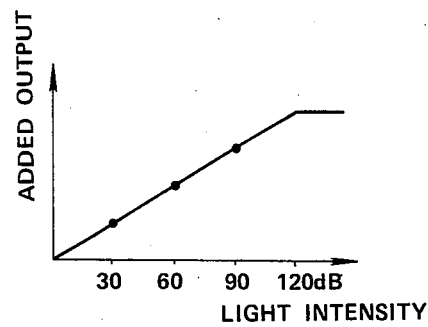
FIG. 12 is a characteristic curve showing the overall relation between the light intensity and CCD output in the means as shown in FIG. 10.

By such a structure, the intensity of illuminating light emitted from light source means 20 is damped by 30 dB per each frame period as shown in FIG. 11 and received on CCD 2. The output from CCD 2 is switched in every frame period through switching circuit 27 to be stored in each of frame memories 28-31 and the outputs therefrom are added through adder 6. Accordingly, the relation between the added output from adder 6 and the incident light intensity reflected from the object is held as shown in FIG. 12 and the dynamic range of this pickup means is extended to 120 dB. In FIG. 10, the dynamic range may be extended further by increasing the number of light intensity switching steps in light source means 20 and providing switching circuits and frame memories corresponding to the number of switching steps.

Figure 13:
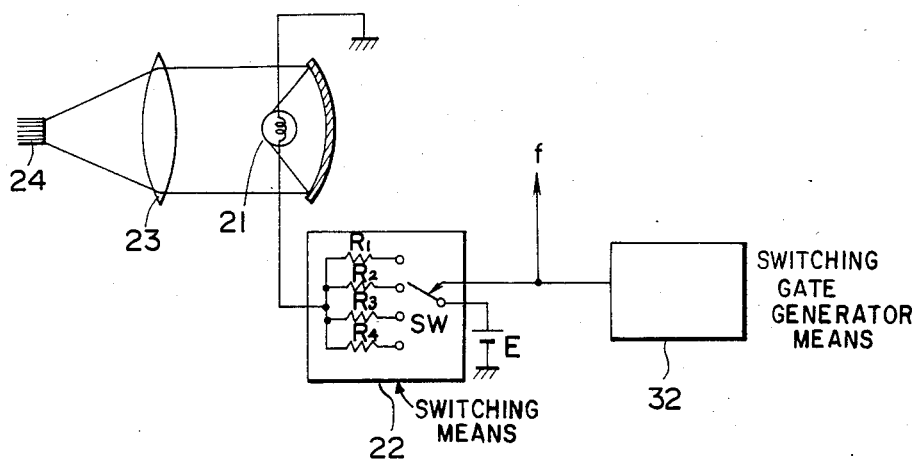
FIG. 13 is a block diagram of an embodiment of the switching means as shown in FIG. 10.

FIG. 13 illustrates an embodiment of switching means 22 as shown in FIG. 10. In this embodiment, switching means 22 are composed of switching circuitry so that the driving current for light source 21 is switched by switching signal f issued from the switching gate generator means 32. A halogen lamp or xenon lamp is employed as light source 21 and the switching circuitry is connectable to four resistors $R_1$-$R_4$ from DC source E through switch SW to supply the driving current in four steps to light source 21 sequentially through each resistor by means of switching signal f. Switching means 22 may be constructed easily with transistor circuitry by employing transistors as switch SW.

Figure 14:
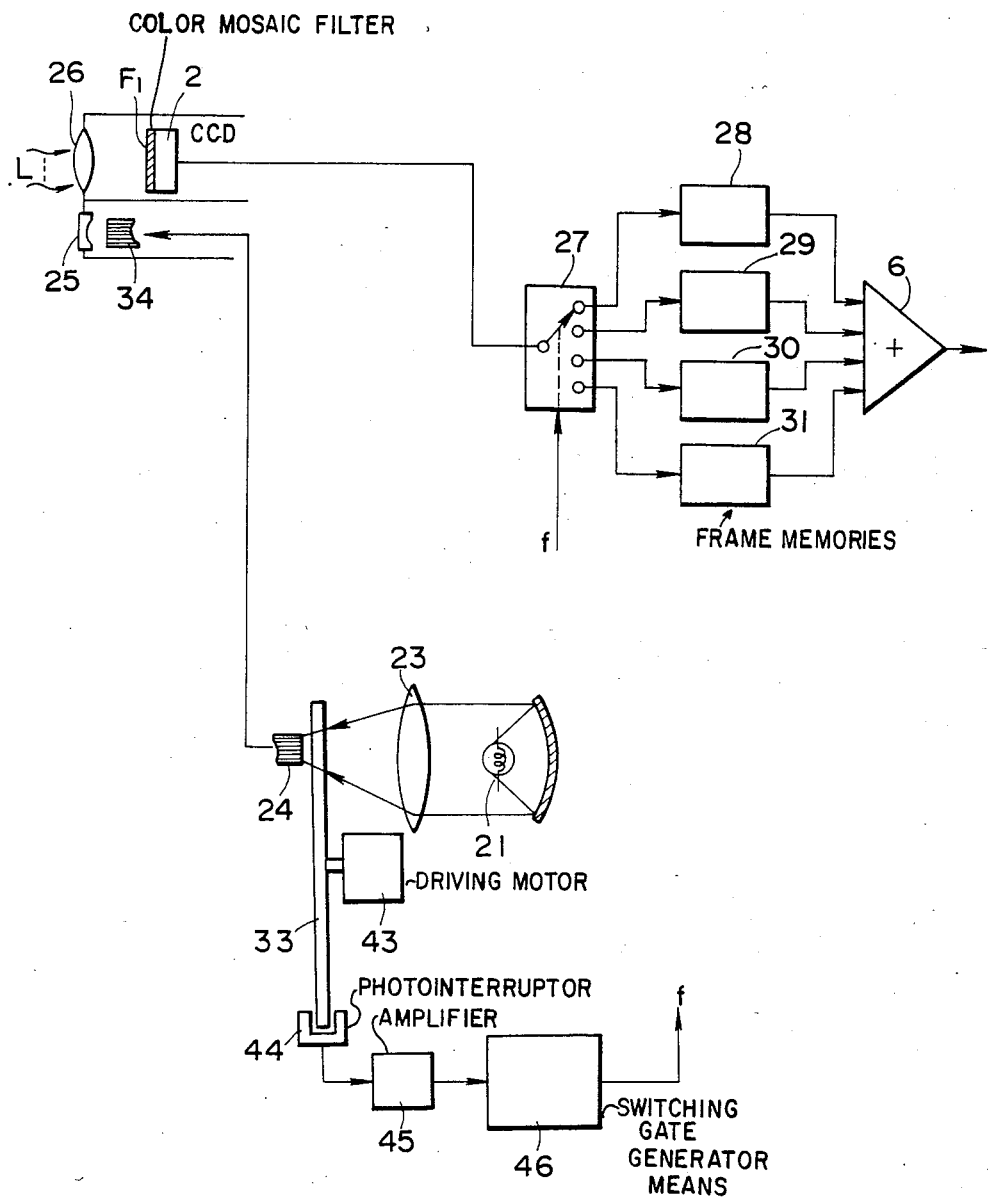
FIG. 14 is a block diagram of a fourth embodiment of the pickup means according to the present invention.
Figure 15:
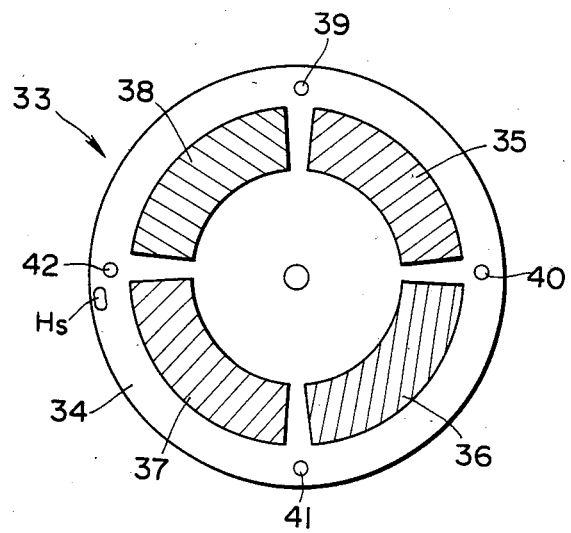
FIG. 15 is a front view of the rotary filter as shown in FIG. 14.

FIG. 14 relates to the fourth embodiment of the present invention wherein CCD 2 with attached color mosaic filter $F_1$ and rotary filter 33 is provided at the leading side of light source 21 as controlling means of light intensity for color image pickup. In such a case, rotary filter 33 is composed of a circular shutter disk 34 wherein neutral density (ND) filters 35, 36, 37, 38 for switching the transmitted light intensity are arranged annularly between sectoral shutters as shown in FIG. 15. The ND filter is of neutral grey and can reduce the light intensity while maintaining color balance. Four filters 35-38 can reduce the transmitted light intensity to 1, $\frac{1}{2}$, $\frac{1}{4}$ and $\frac{1}{8}$ sequentially from filter 35 to filter 38. The rotary filter is provided with holes 39, 40, 41, 42 for detecting the rotational position arranged on the same circle at the vicinity of the outer periphery of the sectoral shutters. Also the rotary filter 33 is provided with a start pulse detecting hole $H_s$ which detects one turn of said filter 33. As shown in FIG. 14, rotary filter 33 is rotated at a constant speed by means of driving motor 43 and the converged light from light source 21 through lens 23 can be passed through ND filters 35-38 by turning the rotary filter. Photointerruptor 44 is equipped at the vicinity of the outer periphery of rotary filter 33 so as to detect the sectoral shutters between ND filters and a single turn of the rotary filter 33 by detecting said holes 39-42 for detecting the rotational position and the start pulse detecting hole $H_s$. A photocoupler is employed as photointerruptor 44 to form the rotary position detecting means together with an amplifier 45 connected to photointerruptor 44. The signals from said holes 39-42 and the hole $H_s$ detected by photointerruptor 44 are amplified through amplifier 45 and supplied to switching gate generator means 46. Switching gate generator means 46 generate frame-switching signal f in synchronization with the hole detecting signal. On the other hand, a mosaic filter $F_1$ composed of red (R), green (G) and blue (B) dots is arranged on the light receiving surface of CCD 2. The light having its intensity varied logarithmically by passing through rotary filter 33 is transmitted subsequently through filter $F_1$ and the converted electrical signals are fed to switching circuits 27. The switching circuits 27 are switched by said frame switching signal f issued from switching gate generator means 46 to store the electric signals from CCD 2 in frame memories 28, 29, 30, 31 at a frame period corresponding to the switching of light intensity by rotary filter 33. The memory outputs from memories 28, 29, 30, 31 are read out concurrently in the line directions corresponding to the respective memories, supplied to adder 6 to be added, and adder 6 supplies an electrical signal with magnified dynamic range. Thereafter, the added output is separated into R, G, and B signals through video signal processor circuits (not shown) to be applied to R, G, B terminals of a color display (not shown) to display a colored image of the object.

Figure 17:
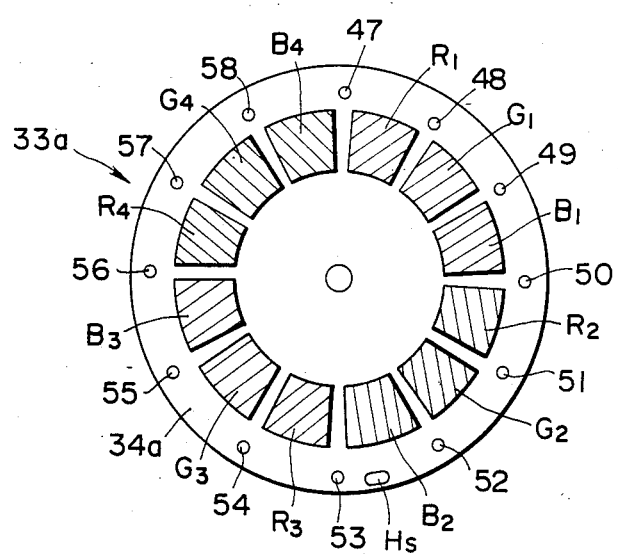
FIG. 17 is a front view of the rotary filter as shown in FIG. 16.
Figure 16:
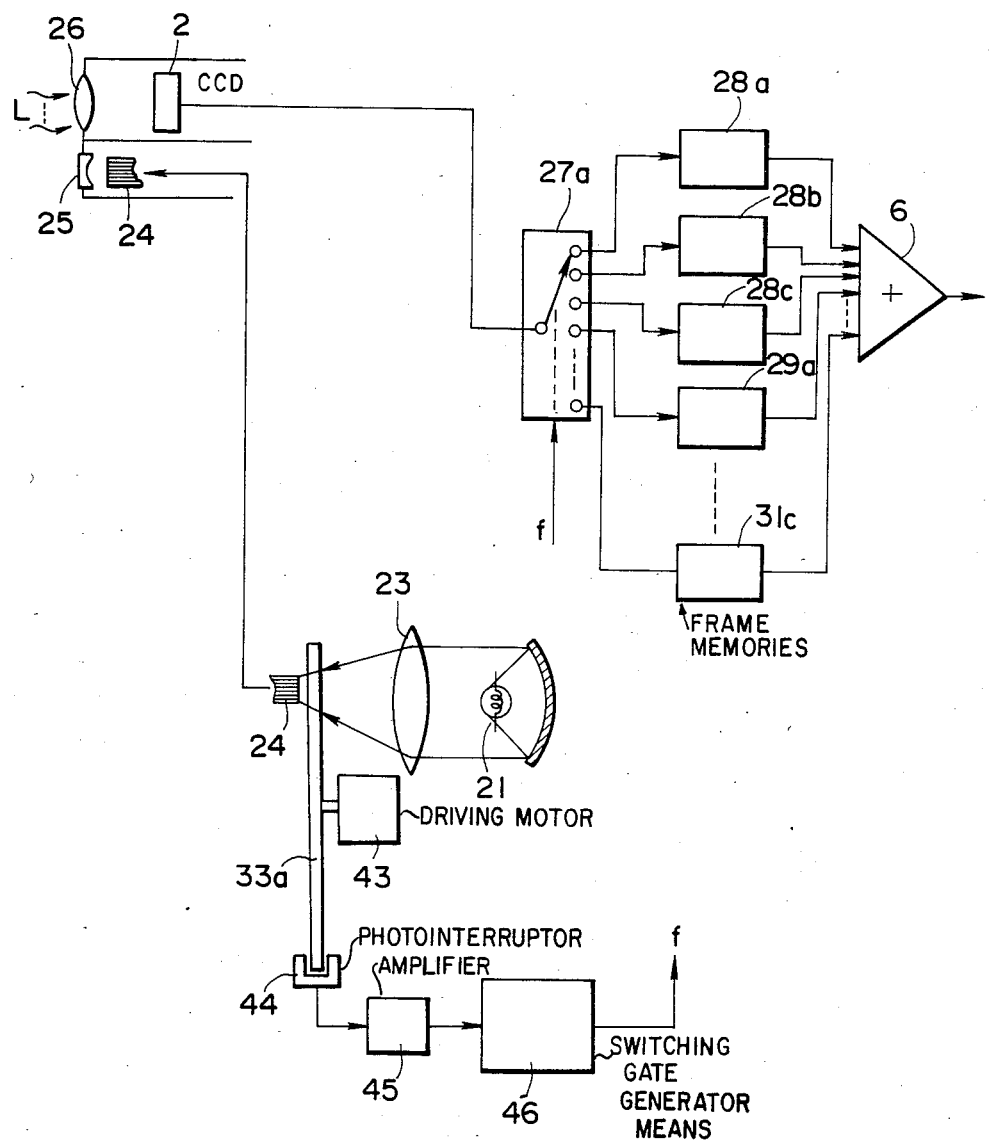
FIG. 16 is a block diagram of the fifth embodiment of the pickup means according to the present invention.

FIG. 16 relates to the fifth embodiment of the present invention wherein CCD 2 for receiving monochroic light is provided, and a rotary filter 33a for transmitting R, G, B light at controllable light intensity is provided at the leading side of light source 21 for color pickup. The outlined structure of this embodiment is similar to the structure as shown in FIG. 14. The structure of rotary filter 33a is shown in FIG. 17. Rotary filter 33a is composed of a circular shutter disk 34a wherein 4 sets of R, G, B sectoral filter ($R_1$, $G_1$, $B_1$), ($R_2$, $G_2$, $B_2$), ($R_3$, $G_3$, $B_3$) and ($R_4$, $G_4$, $B_4$) are arranged so that each set has logarithmically varied light transmission characteristics. The R, G, B filters in each set have the same light transmission characteristic and for example, filters $R_1$, $G_1$, $B_1$ have light intensity transmission characteristics different from that for filters $R_2$, $G_2$, $B_2$. The twelve R, G, B filters in total are arranged between sectoral shutters. The rotary filter 33a is provided with holes 47-58 for detecting the filter's rotational position, arranged on the same circle at the vicinity of the outer periphery of the sectoral shutters. Also, the rotary filter 33a is provided with a start pulse detecting hole $H_s$ which detects one turn of said filter. As shown in FIG. 16, rotary filter 33a is rotated at a constant speed by means of driving motor 43 and the converted light from light source 21 through lens 23 can be passed through twelve sectoral R, G, B filters. Photointerruptor 44 is equipped at the vicinity of the outer periphery of rotary filler 33a so as to detect the sectoral shutters between the R, G, B filters and a single turn of the rotary filter 33a by detecting the rotational position of said holes 47-58 and the start pulse detecting hole $H_s$. A photocoupler is employed as photointerruptor 44 to form the rotary position detecting means together with an amplifier 45 connected to the photointerruptor 44. The signals from said holes 47-58 and the hole $H_s$ detected by photointerruptor 44 are amplified through amplifier 45 to be applied to switching gate generator means 46. Switching gate generator means 46 generate frame-switching signals f in synchronization with the hole detecting signals. On the other hand, the surface of CCD 2 receives successively R, G, and B light having logarthimically varied intensities transmitted through rotary filter 33a in the order of R, G, and B, and the converted electrical signals are put into respective R, G, B frame memories 28a–28c, 29a–29c, 30a–30c, and 31a–31c each in the order of R, G and B through switching circuit 27a. There are provided twelve frame memories corresponding to the twelve R, G, and B filters as shown in FIG. 17. Switching circuits 27a are switched by frame-switching f from switching gate generator means 46 and directed to store the electrical signals from CCD 2 in frame memories 28a–31c in the frame periods corresponding to the number of filters in rotary filter 33a. The memory outputs from frame memories 28a–31c are read concurrently from one line to another line (in the line directions corresponding to the respective frame memories) and added respectively by adder 6. Consequently, adder 6 issues electrical signals having magnified dynamic range. The added outputs are separated into separate R, G, and B color signals by video signal processor circuits (not shown) and applied to the R, G, B terminals of color display means (not shown) to display a color image of the object.

FIG. 17 employs a single disk for transmitting colored light through a number of R, G, B filter sets having varied light transmission characteristics, but such a mechanism can be replaced by a combination of color filters having the same light transmission characteristics with ND filters having varied light damping factors.

It will be now elucidated how to transmit the outputs with magnified dynamic range to the subsequent circuits, to control electrically the throttling or gain and dynamic range.

Figure 18:
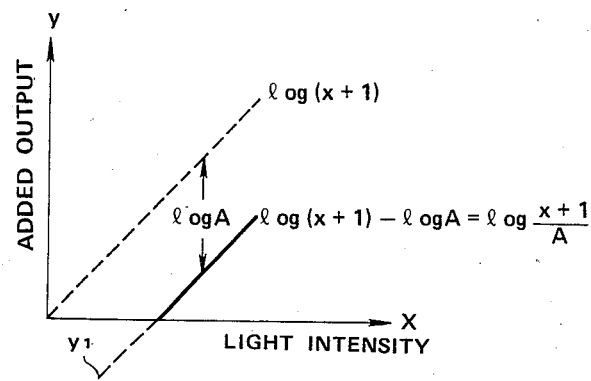
FIG. 18 is a schematic view illustrating the principle for controlling the throttling in the means as shown in FIG. 3, 6, or 10.
Figure 19:
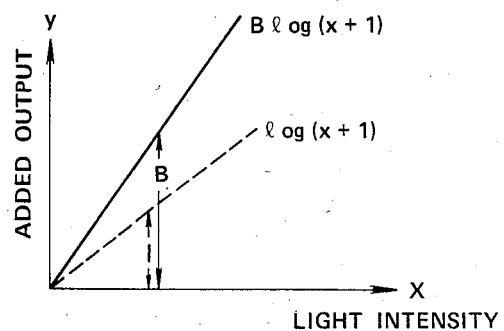
FIG. 19 is a schematic view illustrating the principle for controlling the dynamic range in the means as shown in FIG. 3, 6, or 10.

In such a case, "controlling of throttling" means "to change light intensity x" of incident light L. From the logarithmic relation of $$\log (x + 1) - \log A = \log \frac{x+1}{A}$$

wherein x is the incident light intensity and A is the magnification, the throttling can be controlled by adding or subtracting the DC voltage of log A electrically, thus shifting the graph plot showing the characteristic relation of log (x+1) on a diagram of light intensity and added output in parallel to the y-axis as shown in FIG. 18, and picking up the output which is larger than the zero-level by detecting the output. In FIG. 18, segment $y_1$ shows the output to be removed by the detection. The dynamic range can be controlled by multiplying the inclination of the graph plot for log (x+1) by a multiplier B to provide B log (x+1) so as to be compatible with the input range of the monitor means (television monitor) as shown in FIG. 19.

Figure 20:
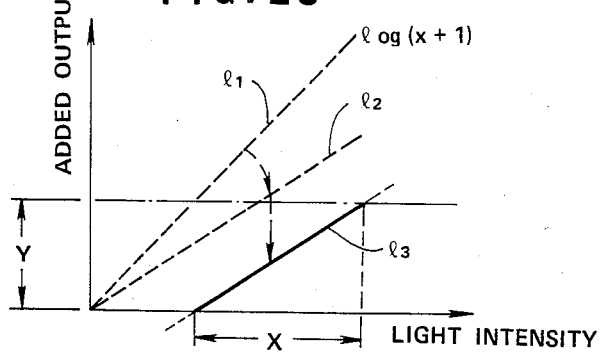
FIG. 20 is a schematic view illustrating the principle for throttling and controlling the dynamic range and displaying on the display in the means as shown in FIG. 3, 6, or 10.

Hence, the throttling and dynamic range can be controlled by changing the inclination of characteristic curve $1_1$ in the graph of input light intensity/output converted logarithmically by changing the dynamic range, changing the inclination of curve $1_1$ to curve $1_2$, and shifting in parallel to $1_2$ to curve $1_3$ by changing the throttling as shown in FIG. 20. The throttling and dynamic range are controlled so that output y resides within the displayable range Y of the monitor means and the input x resides within the input range X.

Figure 21:
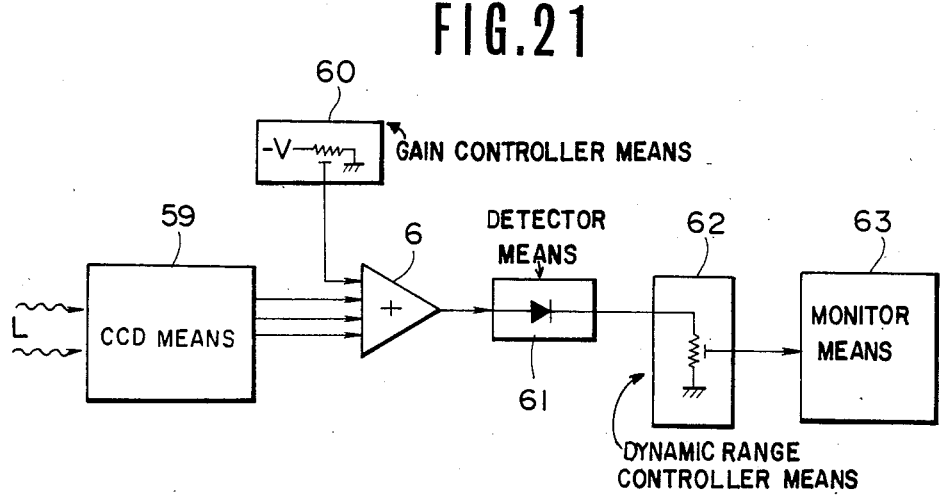
FIG. 21 is an overall block diagram of the pickup means designed on the basis of the principle as illustrated in FIG. 20.

Accordingly, circuits as shown in FIG. 21 are designed for controlling the throttling and dynamic range.

In short, the throttling is controlled by controlling the gain from adder 6 in accordance with the intensity incident light L from CCD means 59 having a logarithmic characteristic to adder 6 by changing the controlling voltage (by dividing the negative partial potential of −V) by means of a gain controller means 60, and the dynamic range is controlled by detecting the added output through detector means 61 (through a diode detector), applying the added output to dynamic range controller means 62 and changing the damping factor (i.e. changng the voltage dividing ratio of resistors) so as to be compatible with the input range of monitor means 63.

Figure 22:
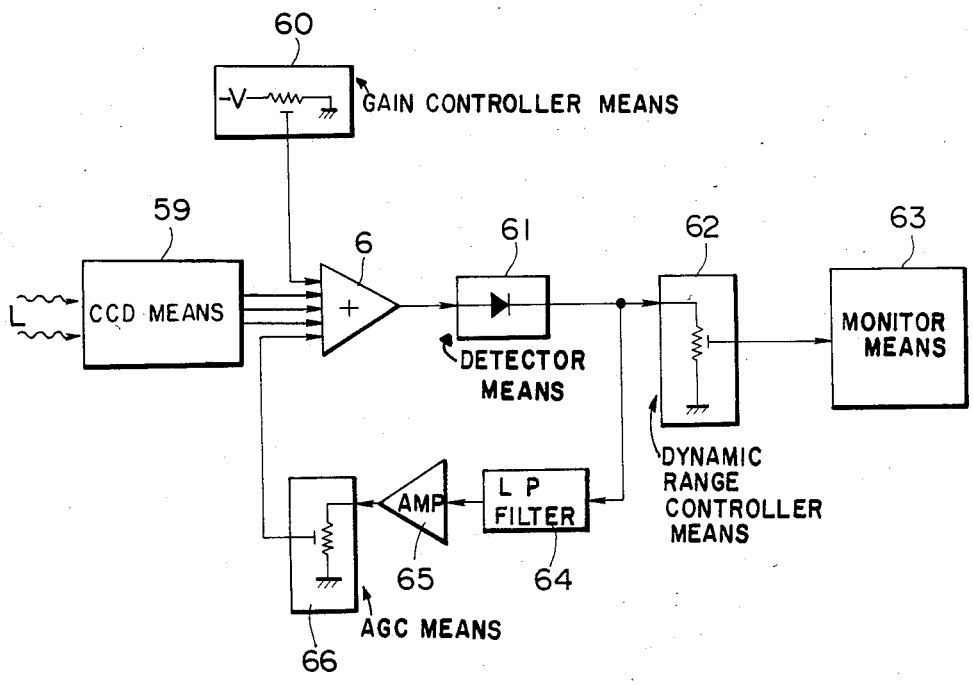
FIG. 22 is a schematic view illustrating the means as shown in FIG. 21 incorporating additionally the controlling means for automatic throttling.

The automatic throttling control is carried out by combining automatic gain controller circuits (AGC) with the circuits of FIG. 21 as shown in FIG. 22.

In FIG. 22, the output from detector means 61 shown in FIG. 21 is passed through low-pass filter 64 to detect the low frequency components which are amplified through amplifier means 65 and supplied to automatic gain controller means 66 to provide an automatic gain controlling voltage (AGC voltage). The AGC voltage is then fed back negatively to adder 6. The AGC voltage is changeable by changing the negative feedback and the response of the automatic gain control section can be made changeable by changing the cut-off characteristics of the low-pass filter 64.

Moreover, since the gain control, automatic gain control and dynamic range control can be naturally carried out during the regeneration of pickup records, such controls can be done at the receiver side for television cameras and at the receiver or regeneration side for electronic cameras during observation of the displayed image.

Various embodiments can be devised based on the present invention without departing from the spirit and scope of the present invention. Accordingly, the present invention should by no means be restricted to any particular embodiment except by the scope of the attached claims.

What is claimed is:

1. Image pickup means comprising:
light intensity controlling means for logarithmically varying the intensity of light incident on said image pickup means and simultaneously transmitting a plurality of light outputs of logarithmically differing intensities;
a plurality of image pickup devices each simultaneously receiving a respective one of said plurality of light outputs and converting said plurality of light outputs into a plurality of electrical signals each corresponding in intensity to respective ones of said light outputs; and
adding means in operable connection with outputs of said plurality of image pickup devices for simultaneously adding said plurality of electrical signals and outputting an output signal corresponding in intensity with said incident light.

2. Image pickup means comprising light intensity controlling means for logarithmically varying the intensity of light incident on said image pickup means and simultaneously transmitting a plurality of light outputs of logarithmically differing intensities;
an image pickup device having a light receiving surface formed of a plurality of picture elements corresponding in number with the number of respective different intensities of said plurality of light outputs and each simultaneously receiving a respective one of said plurality of light outputs and converting said plurality of light outputs into electrical signals of corresponding intensity to said light outputs;

a plurality of signal holding means corresponding in number with said number of respective different intensities of said plurality of light outputs, in operable connection with outputs of said image pickup device for receiving therefrom a plurality of electrical signals corresponding in number to said number of respective different intensities of said plurality of light outputs, storing said received plurality of electrical signals, and simultaneously outputting said plurality of electrical signals; and adding means in operable connection with outputs of said plurality of signal holding means for adding said plurality of electrical signals output from said plurality of signal holding means and outputting an output signal corresponding in intensity with said incident light.

3. Image pickup means according to claim 1, wherein said pickup device comprise at least one charge-coupled device.

4. Image pickup means according to claim 2, wherein said pickup device comprises a charge-coupled device equipped with a color mosaic filter on the light receiving surface for color pickup.

5. Image pickup means according to claim 1, wherein said light intensity controlling means comprise a plurality of half-mirrors arranged on the same straight line along the direction of incident light and spaced apart by a predetermined distance to each other, thereby partly reflecting and partly transmitting the incident light successively to provide light outputs having a plurality of varied intensities and applying the light outputs successively to a plurality of said charge-coupled devices.

6. Image pickup means according to claim 2, wherein said light intensity controlling means comprises an optical filter means capable of damping the incident light intensity logarithmically at a plurality of different damping factors and said optical filter means comprises a number of rows of alternatively arrange filter elements, each row comprised by arranging alternately filter elements having two different closely related damping factors on a straight line parallel to each other to form a plane.

7. Image pickup means according to claim 2, wherein said light intensity controlling means is capable of switching the intensities of an illuminating light source means for illuminating an object successively and logarithmically at a predetermined time interval in synchronization with the switching of an input to said signal holding means.

8. Image pickup means according to claim 7 wherein said light source means are composed so that a current for driving an illuminating light source is controllable.

9. Image pickup means according to claim 7 wherein said light source means are composed of a rotary filter having a plurality of sectoral light-transmitting filters for damping the light from said light source logarithmically with a plurality of varied damping factors arranged between two concentric circles and providing switching signals for said signal holding means by detecting the rotary position of said rotary filter corresponding to the light transmitting filter with each damping factor.

10. Image pickup means according to claim 7 wherein said light source means are composed of a rotary filter capable of transmitting red, green and blue light successively from an illuminating light from said light source and having plural sets of sectoral color-transmitting filters for damping each set of red, green and blue color light logarithmically with a plurality of varied damping factors arranged between two concentric circles and providing switching signals for said signal holding means by detecting the rotary position of said rotary filter corresponding to the color transmitting filters.

11. Image pickup means according to claim 2, wherein said signal holding means are composed of a plurality of sample holding circuits for sample holding successively the outputs from said charge-coupled devices using a sampling pulse.

12. Image pickup means according to claim 2, wherein said signal holding means are composed of a plurality of frame memories for switching the outputs from said image pickup device successively in synchronization with the switching of light intensity from a light source means.

13. Image pickup means according to claim 3, wherein said light intensity controlling means comprise a plurality of half-mirrors arranged on the same straight line along the direction of incident light spaced apart by a predetermined distance to each other, thereby partly reflecting and partly transmitting the incident light successively to provide the light having a plurality of varied intensities and applying the light successively to a plurality of said charge-coupled devices.

14. Image pickup means according to claim 3, wherein said light intensity controlling means comprises an optical filter means capable of damping the incident light intensity logarithmically at a plurality of different damping factors and said optical filter means comprises a number of rows of alternatively arranged filter elements, each row comprised by arranging alternately filter elements having two different closely related damping factors on a straight line parallel to each other to form a plane.

15. Image pickup means according to claim 3, wherein said light intensity controlling means comprise light source means capable of switching the intensities of light for illuminating the object successively and logarithmically at a predetermined time interval in synchronization with the switching of an input to said signal holding means.

16. Image pickup means according to claim 4, wherein said light intensity controlling means comprise light source means capable of switching the intensities of light for illuminating the object successively and logarithmically at a predetermined time interval in synchronization with the switching of an input to said signal holding means.

17. Image pickup means according to claim 3, wherein said signal holding means are composed of a plurality of sample holding circuits for sample holding successively the outputs from said charge-coupled devices using the sampling pulse.

18. Image pickup means according to claim 6, wherein said signal holding means are composed of a plurality of sample holding circuits for sample holding successively the outputs from said charge-coupled devices using a sampling pulse.

19. Image pickup means according to claim 3, wherein said signal holding means are composed of a plurality of frame memories for switching the outputs from said charge-coupled devices successively in synchronization with the switching of light intensity from a light source means.

20. Image pickup means according to claim 4, wherein said signal holding means are composed of a plurality of frame memories for switching the outputs from said charge-coupled devices successively in synchronization with the switching of light intensity from said light source means.

21. Image pickup means according to claim 7, wherein said signal holding means are composed of a plurality of frame memories for switching the outputs from said charge-coupled devices successively in synchronization with the switching of light intensity from said light source means.

22. Image pickup means according to claim 15, wherein said light source means are composed so that the current for driving the illuminating light source is controllable.

23. Image pickup means according to claim 16, wherein said light source means are composed so that current for driving the illuminating light source is controllable.

24. Image pickup means according to claim 15, wherein said light source means are composed of a rotary filter having a plurality of sectoral light-transmitting filters for damping the light from said light source logarithmically with a plurality of varied damping factors arranged between two concentric circles and providing switching signals for said signal holding means by detecting the rotary position of said rotary filter correspondingly to the light transmitting filter with each damping factor.

25. Image pickup means according to claim 16, wherein said light source means are composed of a rotary filter having a plurality of sectoral light-transmitting filters for damping the light from said light source logarithmically with a plurality of varied damping factors arranged between two concentric circles and providing switching signals for said signal holding means by detecting the rotary position of said rotary filter corresponding to the light transmitting filter with each damping factor.

26. Image pickup means according to claim 15, wherein said light source means are composed of a rotary filter capable of transmitting red, green, and blue light successively from the illuminating light from said light source and having plural sets of sectoral color-transmitting filters for damping each set of red, green and blue color light logarithmically with a plurality of varied damping factors arranged between two concentric circles and providing switching signals for said signal holding means by detecting the rotary position of said rotary filter corresponding to the color transmitting filters.

27. Image pickup means according to claim 16, wherein said light source means are composed of a rotary filter capable of transmitting red, green, and blue light successively from an illuminating light from said light source and having plural sets of sectoral color-transmitting filters for damping each set of red, green, and blue color light logarithmically with a plurality of varied damping factors arranged between two concentric circles and providing switching signals for said signal holding means by detecting the rotary position of said rotary filter corresponding to the color transmitting filters.

28. Image pickup means according claim 15, wherein said signal holding means are composed of a plurality of frame memories for switching the outputs from said charge-coupled devices successively in synchronization with the switching of light intensity from said light source means.

29. Image pickup means according to claim 16, wherein said signal holding means are composed of a plurality of frame memories for switching the outputs from said charge-coupled devices successively in synchronization with the switching of light intensity from said light source means.

* * * * *